(12) United States Patent
Hanawa et al.

(10) Patent No.: US 6,411,878 B2
(45) Date of Patent: Jun. 25, 2002

(54) SPEED CHANGE CONTROL SYSTEM FOR AUTOMATIC TRANSMISSION

(75) Inventors: Atsushi Hanawa, Aichi-ken; Koichi Miyamoto, Toyota, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/816,228

(22) Filed: Mar. 26, 2001

(30) Foreign Application Priority Data

Apr. 18, 2000 (JP) ........................................ 2000-116509

(51) Int. Cl.$^7$ ................................................ G06F 7/00
(52) U.S. Cl. ........................................ 701/51; 701/55
(58) Field of Search .............................. 701/51, 52, 53, 701/54, 62, 64; 477/901, 905, 906; 74/336 R, 335

(56) References Cited

U.S. PATENT DOCUMENTS 5,474,508 A * 12/1995 Kondo et al. ................. 701/51
5,526,261 A * 6/1996 Kallis ............................ 701/51
6,217,477 B1 * 4/2001 Nobumoto et al. ........... 701/51
6,259,984 B1 * 7/2001 Kanzak ........................ 701/51

FOREIGN PATENT DOCUMENTS

| JP | 6-147304 A | 5/1994 |
| JP | A-6-147304 | 5/1994 |
| JP | 11-51169 A | 2/1999 |
| JP | A-11-51169 | 2/1999 |

* cited by examiner

Primary Examiner—Richard M. Camby
(74) Attorney, Agent, or Firm—Oliff & Berridge PLC (57) ABSTRACT

A speed change control system for an automatic transmission, for selectively switching a plurality of speed change control modes of different speed change control contents to control a gear ratio of an automatic transmission disposed on an output side of a prime mover. A first speed change control mode is selected if an output demand for the prime mover is in a predetermined state, and the first speed change control mode is switched to a second speed change control mode, if a physical quantity relating to a speed of the prime mover is in a predetermined state when the first speed change control mode is selected.

10 Claims, 4 Drawing Sheets

SPEED CHANGE CONTROL SYSTEM FOR AUTOMATIC TRANSMISSION

BACKGROUND OF THE INVENTION

1. Field of the Invention

The present invention relates to a system for controlling the gear ratio of an automatic transmission disposed on the output side of a prime mover and, more particularly, to a speed change control system for an automatic transmission, for selectively switching control modes to control the gear ratio.

2. Related Art

Generally, an automatic transmission having a gear transmission mechanism is constructed to include: frictional engagement elements to be applied/released for switching torque transmission lines of the gear transmission mechanism; a hydraulic control unit for controlling an oil pressure to be fed to and discharged from the frictional engagement elements; and an electronic control unit for controlling the hydraulic control unit. This electronic control unit is stored with a shift map for providing references for deciding the switching of a gear ratio of the automatic transmission. This shift map determines an upshift line or a downshift line, i.e., shift lines for controlling the gear ratio of the automatic transmission with parameters indicating the running state of a vehicle, such as a vehicle speed or an accelerator depression or opening.

When a signal indicating the running state of the vehicle is inputted to the electronic control unit, moreover, a speed change is decided on the basis of the input signal and the shift map. When the decision to switch the gear ratio of the automatic transmission is made, a shift signal is outputted from the electronic control unit so that the frictional engagement elements are applied/released to execute the speed change by the hydraulic control unit.

On the other hand, the shift map determines the gear ratio in accordance with the running state, as represented by the vehicle speed or the accelerator opening, so that the characteristics of the vehicle change in various ways according to the manner to set the region of the gear ratio. If the region of a higher gear ratio is set so far to a running state of a relatively high vehicle speed, more specifically, the power performance improves. If the region of a low gear ratio is set to a running state of a relatively low vehicle speed, on the other hand, the increase in the speed of the prime mover can be suppressed to take an advantage for improving the fuel economy. In the prior art, therefore, there is known a technique, in which there are prepared: a shift map constructed to have characteristics thinking much of the fuel economy of the prime mover; and a shift map constructed to have characteristics thinking much of the power performance of the vehicle, so that the shift maps are changed by the manual operation of the driver. In the prior art, moreover, there is proposed a technique for switching the shift maps of different control contents automatically according to the change in the running load on the vehicle.

One example of the speed change control system for the automatic transmission, for switching the maps of different speed change control contents automatically according to the change in the running load on the vehicle has been disclosed in Japanese Patent Application Laid-Open No. 6-147304 or 11-51169. In the speed change control system disclosed in Japanese Patent Application Laid-Open No. 6-147304, the running load on the vehicle is estimated on the basis of the vehicle weight, the output torque of the engine and the vehicle acceleration, and a shift map is selected on the basis of the estimation result of the running load on the vehicle. The contents of the shift map thus selected are different in the speed change control contents for either an upshift or a downshift. For the upshift, for example, the speed change control contents are such that the upshift line is set toward the higher vehicle speed side for the larger vehicle weight and the heavier load. For the downshift, on the other hand, the speed change control contents are such that the downshift line is moved toward the lower degree of throttle opening for the heavier load. At the time of a heavy load and a large vehicle weight, therefore, a relatively high gear ratio can be easily selected to improve the power performance of the vehicle.

On the other hand, the speed change control system, as disclosed in Japanese Patent Application Laid-Open No. 11-51169, is applied to a vehicle such as a tractor for pulling a trailer. Specifically, the speed control system of this Laid-Open employs a shift map of such speed change characteristics that a relatively low gear ratio is easily selected at a light-load time when the tractor runs by itself. In a heavy-load state where the tractor runs while pulling the trailer, on the other hand, there is employed a shift map having contents in which a relatively high gear ratio is fixed. Thus, shift maps of different kinds are automatically interchanged on the basis of whether or not the tractor pulls the trailer, to take advantages in the improvements in the drivability and in the fuel economy of the prime mover.

In the control system of this kind for the automatic transmission, however, the shift map to be used in the heavy-load running state, i.e., with the accelerator being fully opened, is prepared such that the upshift line is intrinsically set on the higher speed side to set the higher gear ratio easily. Considering the delay, i.e., the response delay of the oil pressure till the speed change is actually started after the output of a shift signal, more specifically, the shift map is set so that the engine speed at the instant when the speed change is actually started may become a value near the upper limit of an allowable speed. Where the upshift line of the shift map is set to a higher vehicle speed side so as to meet the heavy-load demand, as disclosed in the Laid-Open, therefore, the vehicle speed may rise with the high gear ratio to cause the so-called "over-rev state" in which the engine speed exceeds the allowable value to reach the red zone.

On the other hand, there can be conceived a control, in which shift maps of different vehicle speeds for setting the upshift line are prepared for the non-pulling state and the pulling state and are interchanged by a switching operation. If this switching operation is mistaken to employ the shift map corresponding to the tractive state in the non-pulling state, however, the upshift is not effected till the engine speed exceeds a predetermined value, and the over-rev state may be invited like the above.

SUMMARY OF THE INVENTION

A main object of the invention is to provide a speed change control system for an automatic transmission, for making a speed change control of the automatic transmission of a running vehicle into one suited for a heavy-load running state and for suppressing the rise of the speed of a prime mover to a predetermined value, when the running vehicle is in the heavy-load running state such as when it pulls another vehicle.

According to the invention, there is provided a speed change control system for an automatic transmission, for selectively switching a plurality of speed change control modes of different speed change control contents to control the gear ratio of an automatic transmission disposed on the output side of a prime mover. A first speed change control mode is selected if an output demand for said prime mover is in a predetermined state, and said first speed change control mode is switched to a second speed change control mode if a physical quantity relating to the speed of said prime mover is in a predetermined state when said first speed change control mode is selected.

In the control system of the invention, therefore, the first speed change control mode is selected if the output demand for the prime mover is in the predetermined state, and the first speed change control mode is switched to the second speed change control mode if the physical quantity relating to the speed of the prime mover is in a predetermined state when the first speed change control mode is selected. Therefore, the gear ratio is controlled according to the changing state of the physical quantity, as caused by the change in the running load on the vehicle. Up to the vehicle speed just before the physical quantity relating to the prime mover speed reaches a predetermined large value, for example, the gear ratio of the automatic transmission can be kept at a value as high as possible. As a result, the drive region of the prime mover is so widened that the power performance of the vehicle may be maximized, to avoid shortage of the driving force in the case of a heavy-load run thereby to improve the drivability.

The above and further objects and novel features of the invention will more fully appear from the following detailed description when the same is read with reference to the accompanying drawings. It is to be expressly understood, however, that the drawings are for the purpose of illustration only and are not intended as a definition of the limits to the invention.

DETAILED DESCRIPTION OF THE PREFERRED EMBODIMENT

Figure 2:
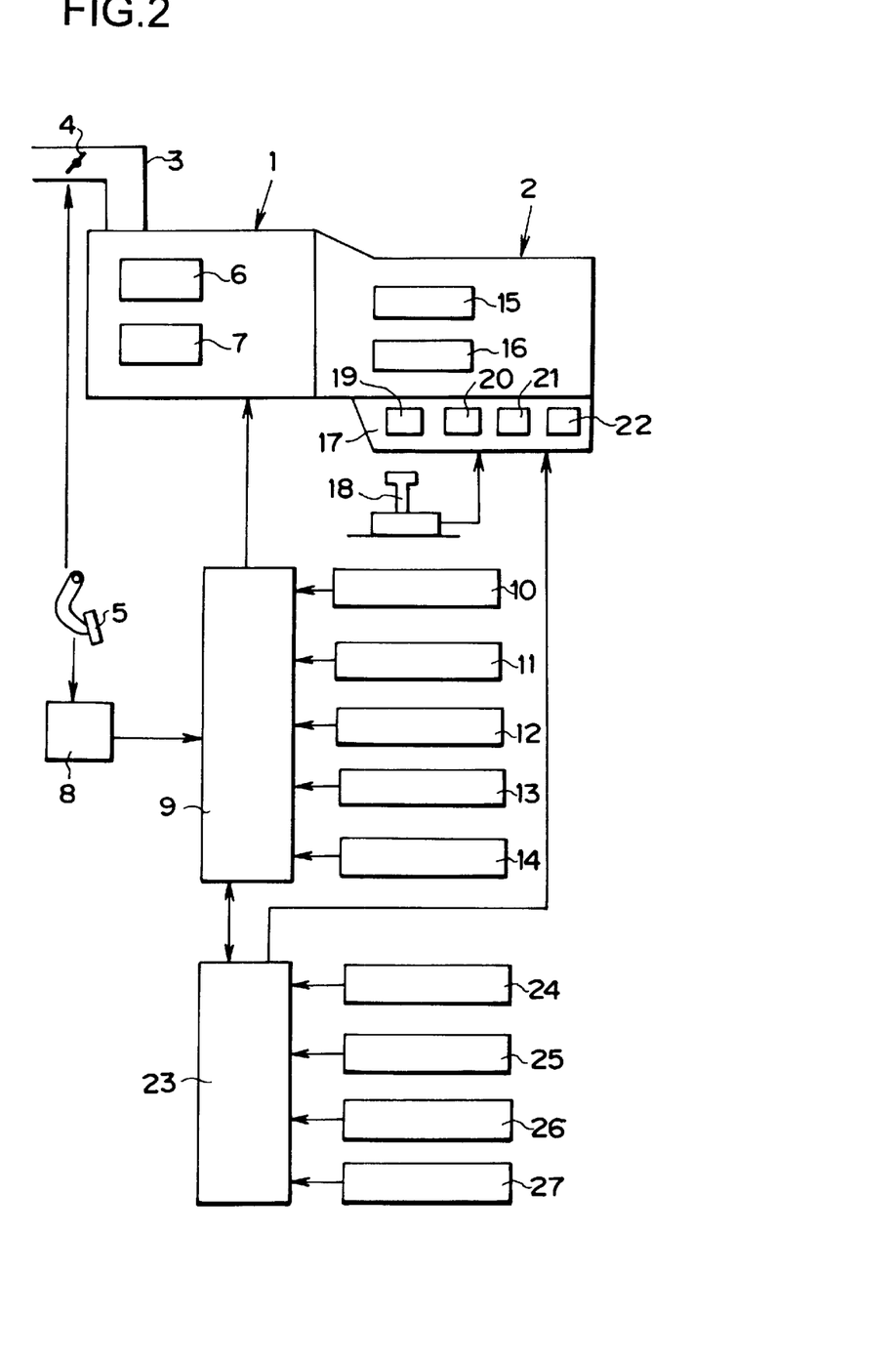
FIG. 2 is a diagram showing an overall control system according to the invention.

The invention will be specifically described with reference to the accompanying drawings. FIG. 2 is a block diagram showing an overall control system of a vehicle to which the invention is applied. In FIG. 2, the prime mover of the vehicle is exemplified by an engine 1, which is connected on its output side to an automatic transmission 2. As the engine 1, there can be used an internal combustion engine such as a gasoline engine, a Diesel engine or an LPG engine. This embodiment will be described on the case in which the gasoline engine is used as the engine 1.

The engine 1 is provided at its intake pipe 3 with a throttle valve 4, the opening rate of which is varied on the basis of the operation of an accelerator pedal 5. There are further provided a fuel injection control unit 6 for controlling the fuel feed to the engine 1, and an ignition timing control unit 7 for controlling the ignition of a mixture of a fuel and air. On the other hand, a depression of the accelerator pedal 5, i.e., an accelerator opening, as indicating an output demand for the engine 1, is detected by an accelerator pedal switch 8, the detection signal of which is inputted to an engine electronic control unit 9. This engine electronic control unit 9 is constructed of a microcomputer which is composed mainly of a central processing unit (CPU), a memory unit (RAM, ROM) and an input/output interface.

To this engine electronic control unit 9, there are inputted control data including: a signal of an engine speed sensor 10 for detecting an engine speed NE; a signal of an intake air flow rate sensor 11 for detecting an intake air flow rate Q; a signal of an intake air temperature sensor 12 for detecting an intake air temperature; a signal of a throttle sensor 13 for detecting the opening rate of the throttle valve 4; and a signal of an engine water temperature sensor 14 for detecting an engine water temperature.

On the other hand, the automatic transmission 2 is provided with a gear speed change mechanism 15 constructed of a plurality of planetary gear mechanisms, and frictional engagement elements 16 including clutches and brakes to be applied/released for switching the torque transmission lines of the gear speed change mechanism 15. The automatic transmission 2 thus constructed can set a plurality of forward stages (i.e., gear ratios). These forward stages are exemplified by 1st to 5th gear stages. Here, a reverse stage is fixed at a predetermined gear ratio. In other words, the automatic transmission 2 is the so-called "step type automatic transmission" capable of switching the gear ratios stepwise.

On the other hand, the gear ratios of the automatic transmission 2 are controlled by applying/releasing the frictional engagement elements 16. For controlling these frictional engagement elements 16, there is provided a hydraulic control unit 17. This hydraulic control unit 17 is provided with a manual valve 19, a plurality of shift solenoids 20, a plurality of shift valves 21 and a linear solenoid valve 22. The manual valve 19 is activated by the operation of a shift lever 18 or a kind of the shift position change-over device. The shift solenoids 20 are electrically controlled ON/OFF to output signal pressures. On the basis of these signal pressures outputted from the shift solenoids 20, the shift valves 21 open/close the oil lines connecting the output port of the manual valve 19 and the hydraulic chambers of the individual frictional engagement elements 16, to control the applications/releases of the individual frictional engagement elements 16. The linear solenoid valve 22 controls a line pressure in a hydraulic circuit in accordance with the accelerator opening or the throttle opening.

With the hydraulic control unit 17, there is connected an automatic transmission electronic control unit 23 constructed of a microcomputer which is composed mainly of a central processing unit (CPU), a memory unit (RAM, ROM) and an input/output interface. This automatic transmission electronic control unit 23 and the engine electronic control unit 9 are connected with each other for data communications. To the automatic transmission electronic control unit 23, moreover, there are inputted: a signal of a turbine speed sensor 24 for detecting the turbine speed (or the input speed) of the automatic transmission 2; a signal of an output speed sensor 25 for detecting the output speed of the automatic transmission 2; a signal of an oil temperature sensor 26 for detecting the working oil temperature of the hydraulic control unit 17; and a signal of a shift position sensor 27 for detecting the operation of the shift lever 18. Here, the vehicle speed is calculated on the basis of the output speed sensor 25.

In the engine electronic control unit 9 and the automatic transmission electronic control unit 23, moreover, the data, as detected by the various sensors and switches, are processed to decide the running state or the running load of the vehicle. On the basis of these decision results, it is performed to control the fuel injection rate by the fuel injection control unit 6, the ignition timing by the ignition timing control unit 7 and the gear ratio of the automatic transmission 2.

In this automatic transmission 2 thus constructed, the shift lever 18 can be manually operated to selectively switch the individual shift positions including a P (Parking) position, an R (Reverse) position, an N (Neutral) position, a D (Drive) position, a "4" position, a "3" position, a "2" position and an L (Low) position. Of these shift positions, the D (Drive) position, the "4" position, the "3" position, the "2" position and the L (Low) position belong to the forward drive positions.

In the D-position, the gear stage can be selectively switched within the speed range (i.e., the shift range) of the 1st to the 5th speeds; in the "4"-position, the gear stage can be selectively switched within the speed range of the 1st to the 4th speeds; in the "3"-position, the gear stage can be selectively switched within the speed range of the 1st to the 3rd speeds; in the "2"-position, the gear stage can be selectively switched within the speed range of the 1st and the 2nd speeds; and in the L-position, the gear stage is fixed at the 1st speed. Here, it is apparent that as the numeral indicating the gear stage becomes the larger, the gear ratio becomes the lower.

On the other hand, the automatic transmission electronic control unit 23 is stored with the well-known shift maps (although not shown) for controlling the speed change of the automatic transmission 2. In these shift maps, the running states of the vehicle such as the accelerator opening and the vehicle speed are used as parameters to set shift lines to be used as a decision reference for switching the gear stage of the automatic transmission 2, as specified by an upshift line and a downshift line.

On the basis of both the data including the accelerator opening and the vehicle speed, as inputted to the automatic transmission electronic control unit 23, and the shift maps, moreover, the speed change decision is made on whether or not the gear stage of the automatic transmission 2 is to be switched. If this speed change decision is satisfied, moreover, the shift signal is outputted from the automatic transmission electronic control unit 23 to control the ON/OFF of the individual shift solenoids 20, and the applications/releases of the individual frictional engagement elements 16 are controlled by the actions of the individual shift valves 21, so that the speed change is executed. In the corresponding relation between the aforementioned specific construction and the construction of the invention, the engine 1 corresponds to the prime mover of the invention.

Here will be described controls to change the speed change control mode of the automatic transmission 2 of a running vehicle, where this vehicle is in a single running state and where the vehicle is in a traction running state and in a heavy-load running state. Here, the "single running state" means that the vehicle is running without pulling another vehicle, namely, that the vehicle is running in a light load. Moreover, the "single running state" may be conveniently expressed by the "ordinary running state". On the contrary, the "traction running state" means that the vehicle is running while pulling another. Here, the "traction running state" may be conveniently expressed simply by the "tractive state". Moreover, the "heavy-load running state" means that the vehicle is running uphill. Here in this specific embodiment, it is enumerated as the heavy-load running state that the accelerator or the throttle is fully opened in the traction running state.

Figure 3:
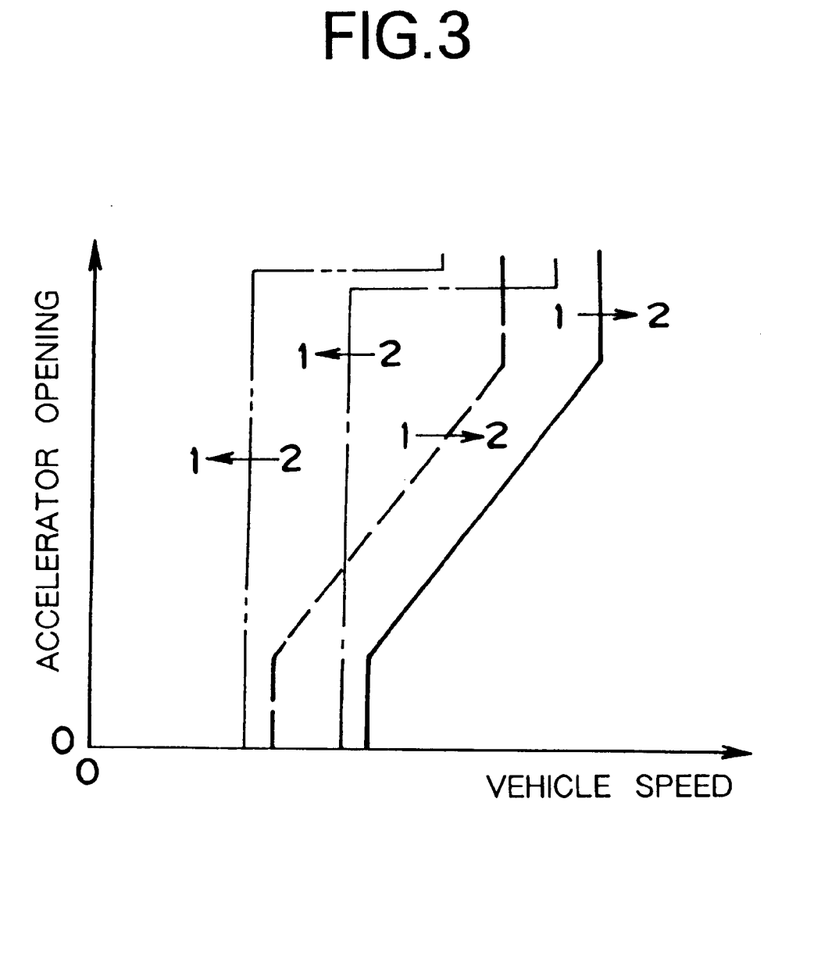
FIG. 3 is a diagram illustrating one example of shift maps to be used in the speed change controls of the automatic transmission in the invention.

FIG. 3 illustrates a portion of one example of the shift maps which are used for controlling the speed changes of the automatic transmission 2 in the tractive state. In FIG. 3, there are inclusively illustrated: shift maps which are used in the ordinary running state (as will be called the "first shift maps"); and shift maps which are used where the running state is tractive and under a heavy load and where the changes in the physical quantity relating to the engine speed are at a predetermined value or lower (as will be called the "second shift maps"). The shift maps of FIG. 3 are provided, by using the vehicle speed and the accelerator opening as the parameters, with upshift lines (or upshift points) for a decision reference for the upshift from the 1st to the 2nd speeds, and downshift lines (or downshift points) for a decision reference for the downshift from the 2nd to the 1st speeds.

In FIG. 3, the upshift line to be used in the ordinary running state is illustrated by a broken line, and the downshift line to be used in the ordinary running state is illustrated by double-dotted line. On the other hand, the upshift line to be used where the running state is under the heavy load and where the changes in the physical quantity relating to the engine speed are at the predetermined value or lower is illustrated by a solid line. Moreover, the downshift line to be used where the vehicle is running in the tractive state and under the heavy load and where the changes in the physical quantity relating to the engine speed are at the predetermined value or lower is indicated by the single-dotted line.

As illustrated in FIG. 3, the upshift line of the second shift map is set on the higher vehicle speed side than the upshift line of the first shift map. Moreover, the downshift line of the second shift map is set on the higher vehicle speed side than the downshift line of the first shift map. In short, the second shift map is so characterized that the higher gear ratio (i.e., the 1st speed) is more easily set than the first shift map. Here, the shift maps for the ordinary running state, as illustrated in FIG. 3, can be used, if the changes in the physical quantity relating the engine speed exceed a predetermined value even where the vehicle is in the tractive state and under the heavy load.

Here, the shift maps illustrated in FIG. 3 correspond to the state in which the D-position are selected, but shift maps similar to those of FIG. 3 can be used if the shift position is at a forward running one other than the L-position. Although not illustrated, on the other hand, the first shift map and the second shift map to be used in the case of an upshift or a downshift between the gear stages of the 2nd to the 5th speeds can also be set to characteristics similar to the first shift map and the second shift map illustrated in FIG. 3. In other words, the first shift map and the second shift map to be used in the case of the upshift or the downshift between the 2nd to the 5th gear stages are so determined on their upshift lines and downshift lines that the second shift map may set the relatively higher gear ratio more easily than the first shift map.

As the method of switching the first shift map and the second shift map, there can be enumerated a method of storing the two shift maps separately in advance in the automatic transmission electronic control unit 23 so that the shift maps may be interchanged, and a method of achieving the second shift map by correcting the first shift map.

Here will be described the speed change control of the automatic transmission 2 with reference to the flow chart of FIG. 1. First of all, it is decided (at Step S1) whether or not there are satisfied preconditions for switching from the first shift map corresponding to the ordinary running state of the driven car to the second shift map corresponding to the traction running state of the car. These preconditions are satisfied if it is affirmed that the D-position is selected, that the 1st speed is set, that the control of the engine torque is not inhibited, and that the systems of the electronic control units 9 and 23, the hydraulic control unit 17 and the various sensors and switches are normal. In short, it is confirmed at Step S1 whether or not the system of the vehicle is normal and the engine 1 has completed its warming up to have a stabilized combustion state. If the answer of Step S1 is NO, the routine is returned.

If the answer of Step S1 is YES, it is decided (at Step S2) whether or not the throttle or the accelerator is fully opened. If the answer of Step S2 is NO, the running vehicle is under a light load so that the routine is returned.

At the instant when the answer of Step S2 is YES, there is selected the first shift map, as illustrated in FIG. 3. On the basis of this first shift map, it is then decided (at Step S3) whether or not the present vehicle speed is one just before the upshift from the 1st speed to the 2nd speed. If the answer of Step S3 is NO, the routine is returned as it is.

If the answer of Step S3 is YES, on the contrary, the changing rate of the vehicle speed for a predetermined time period, i.e., an acceleration is estimated (at Step S4) on the basis of the changing state (i.e., the variation or the rate of change) of the present vehicle speed. It is further decided (at Step S5) whether or not the changing rate of the vehicle speed estimated at Step S4 is no more than a threshold value. This threshold value is stored in advance in the automatic transmission electronic control unit 23. In other words, Step S5 decides, on the basis of the estimated result of the changing rate of the vehicle speed, whether or not the running vehicle is running uphill (i.e., in the heavy-load running state). On the basis of this changing rate of the vehicle speed, it is also possible to estimate the slope of the road on which the vehicle runs uphill.

If the answer of Step S5 is YES, it is decided (at Step S6) whether or not the state, in which the actual changing rate of the vehicle speed is no more than the threshold value, occurs consecutively more than times of reference number N within a predetermined time period. This decision of Step S6 confirms whether or not the heavy-load running state occurs consecutively.

If the answer of Step S6 is YES, there is fixed (at Step S7) the decision that the vehicle is in the traction running state and in the heavy-load running state. At the same time, the speed change control on the basis of the first shift map is quit and switched (at Step S8) to the speed change control on the basis of the second shift map, and this control routine is ended.

Figure 4:
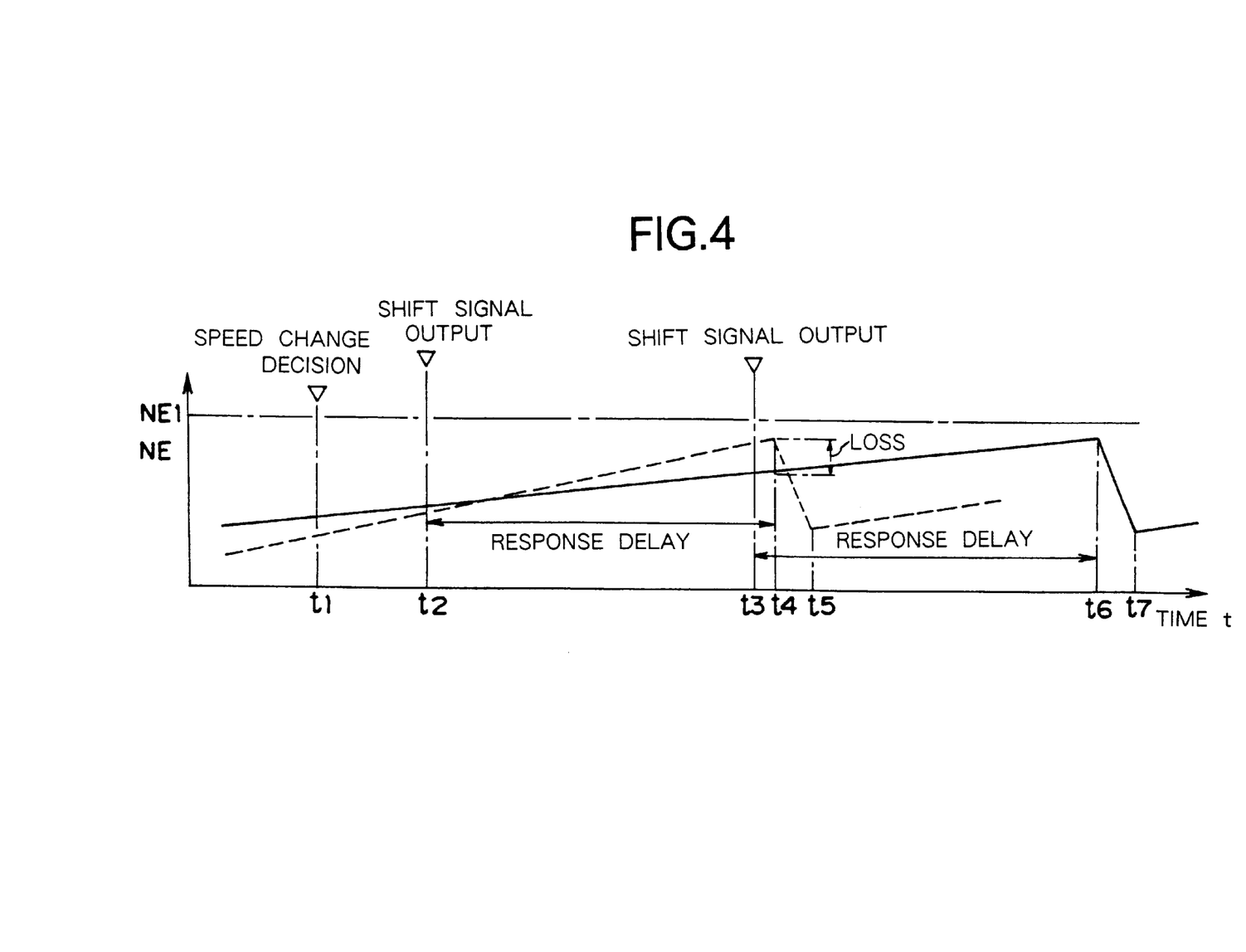
FIG. 4 is a diagram illustrating one example of a time chart corresponding to control contents of FIG. 1.

Here will be specifically described the controls of Step S8 by comparing the speed change control on the first shift map with the speed change control on the second shift map. First of all, an example of the speed change control of the automatic transmission 2 merely in the tractive state will be described with reference to the time chart of FIG. 4. FIG. 4 illustrates the time changes of the physical quantity (i.e., the physical quantity changing in accordance with the change in the running load and relating to the vehicle speed). These physical quantities are exemplified by the engine speed, the turbine speed or the output speed, of which the engine speed is conveniently adopted. In FIG. 4, the changing characteristics corresponding to the first shift map are illustrated by a broken line, and the changing characteristics corresponding to the second shift map are illustrated by a solid line.

Where the first shift map is selected, as described above, before the decision of a speed change of the upshift from the 1st to the 2nd speeds is made at time t1, the changing state of the physical quantity at the instant when the speed change is actually started is estimated, on the basis of the changing state (i.e., the variation or the rate of change) of the physical quantity relating to the engine speed at that instant.

On the basis of this decision result, moreover, there is calculated the timing at which the shift signal is outputted. After the shift signal was outputted and before the speed change is actually started (i.e., before an inertia phase is started), there arises a response delay time. By considering this response delay time, therefore, the output timing of the shift signal is calculated so that the engine speed at the instant when the upshift is started may be slightly lower than the allowable speed of the engine 1. Here, the response delay time is the delay time which is based on the mechanical causes in the hydraulic circuit such as the applications/releases of the frictional engagement elements 16 by feeding/discharging the oil pressure.

Thus in the traction running state, there is determined the time period after the upshift decision was made and before the shift signal is outputted. Moreover: at time t1, the speed change decision is made; at time t2, the shift signal is outputted; and at time t4, the upshift is actually started. Then, the engine speed begins to fall, but then gradually rises after the speed change is completed at time t5.

Where the routine advances to Step S8, on the other hand, the shift map is switched from the first to the second ones. Before this switching of the shift maps, here will be described the upshift line, as illustrated by the solid line in FIG. 3.

First of all, before the speed change decision on the basis of the first shift map is made, on the basis of the changing state of the physical quantity (i.e., at least one of the output shaft speed, the engine speed and the turbine speed) relating to the engine speed at that instant, there is estimated the physical quantity at the instant when the speed change is actually started. This estimation is made on the basis of the data of Step S4 as described above. At the time of estimating the physical quantity, on the other hand, there is considered the response delay time for the period after the shift signal was outputted and before the speed change is actually started. Then, the timing of outputting the shift signal is calculated so that the engine speed at the time of starting the speed change actually may be slightly lower than the allowable speed.

Even where the second shift map is thus used, too, the time period from the speed change decision to the output of the shift signal is determined so that it may be longer than that in the aforementioned case in which the speed change is executed on the basis of the first shift map. Specifically, the upshift line is set to a relatively higher speed side, as illustrated by the solid line in FIG. 3. Thus, the timing for the upshift is delayed till the vehicle speed rises, thereby to elongate relatively the time period from the instant of the speed change decision to the output of the shift signal.

Here will be described the contents of the speed change control corresponding to the second shift map with reference to the time chart of FIG. 4. Assuming the state in which the upshift decision from the 1st to the 2nd speeds based on the first shift map and the upshift decision from the 1st to the 2nd speeds based on the second shift map are made at the identical time t1, FIG. 4 illustrates the two speed change control contents in contrast. Since the broken upshift line and the solid upshift line have the different vehicle speeds for the references to the speed change decisions of the upshifts, as illustrated in FIG. 3, the engine speeds at the time t1 when the upshift decision is made in FIG. 4 are different between in the ordinary running state and in the traction running and the heavy-load running state. Since the time period after the speed change decision in the traction running state and in the heavy-load running state was made and before the shift signal is outputted is set longer than the time period from the speed change decision in the ordinary running state was made and before the shift signal is outputted, as described hereinbefore, the shift signal is outputted not at the time t2 but at later time t3, when the vehicle is in the traction running state and in the heavy-load running state.

Even in the case of the traction running state and the high-load running state, too, the engine speed has risen for a predetermined time period after the shift signal was outputted. When the upshift is actually started at time t6 after the response delay time elapsed from the output of the shift signal, the engine speed has further fallen from the state of the speed of a red zone NE1 or lower. On and after time t7 when the upshift is completed, the engine speed gradually rises.

In this specific embodiment thus far described, on the basis of the loss, i.e., the difference between the estimated value of the changing state of the engine speed at the instant of starting the speed change in the traction running state and the estimated value of the changing state of the engine speed at the instant of starting the speed change in the traction running state and in the heavy-load running state, the output timing of the shift signal in the traction running state and in the heavy-load running state is delayed from the output timing of the shift signal in the ordinary running state. This delay is equivalent to that the second output speed, at which the shift signal is outputted in the traction running state and in the heavy-load running state, is set to the summed value of a predetermined speed α and the first output speed, at which the shift signal is outputted in the ordinary running state, if it is assumed, as shown in FIG. 4, that the timing at which the speed change decision is made in the ordinary running state is identical to the timing at which the speed change decision is made in the traction running state and in the heavy-load running state.

Here at the foregoing Steps S4, S5 and S8, the variation of the output speed (i.e., the vehicle speed) can be replaced by other data capable of making a highly precise decision on whether or not the engine 1 becomes an over-rev, such as the variation of the engine speed or the variation of the turbine speed. Specifically: at Step S4, the variation of the engine speed is calculated; at Step S5, it is decided whether or not the variation of the engine speed, as calculated at Step S4, is less than the threshold value; if the answer of Step S5 is YES, it is decided at Step S6 whether or not the state of the variation of the engine speed less than the threshold value occurs consecutive N times or more within the predetermined time period; and if the answer of Step S6 is YES, the routine advances via Step S7 to Step S8.

Where the variation of the turbine speed is used, on the other hand: at Step S4, the variation of the turbine speed is calculated; at Step S5, it is decided whether or not the variation of the turbine speed, as calculated at Step S4, is less than the threshold value; if the answer of Step S5 is YES, it is decided at Step S6 whether or not the state of the variation of the turbine speed less than the threshold value occurs consecutive N times or more within the predetermined time period; and if the answer of Step S6 is YES, the routine advances via Step S7 to Step S8.

Here in the control example thus far described, as illustrated in FIG. 3, there is used the shift map in which the set vehicle speeds of the upshift line are made different between the ordinary running state, and the traction running state and the heavy-load running state. At the same time, the time period after the speed change decision was made and before the shift signal is outputted is set longer in the traction running state and the heavy-load running state than in the ordinary running state, so that the output timing of the shift signal in the traction running state and the heavy-load running state is delayed more than the output timing of the shift signal in the ordinary running state. By another control method, however, the output timing of the shift signal in the traction running state and the heavy-load running state can also be delayed more than the output timing of the shift signal in the ordinary running state.

Figure 1:
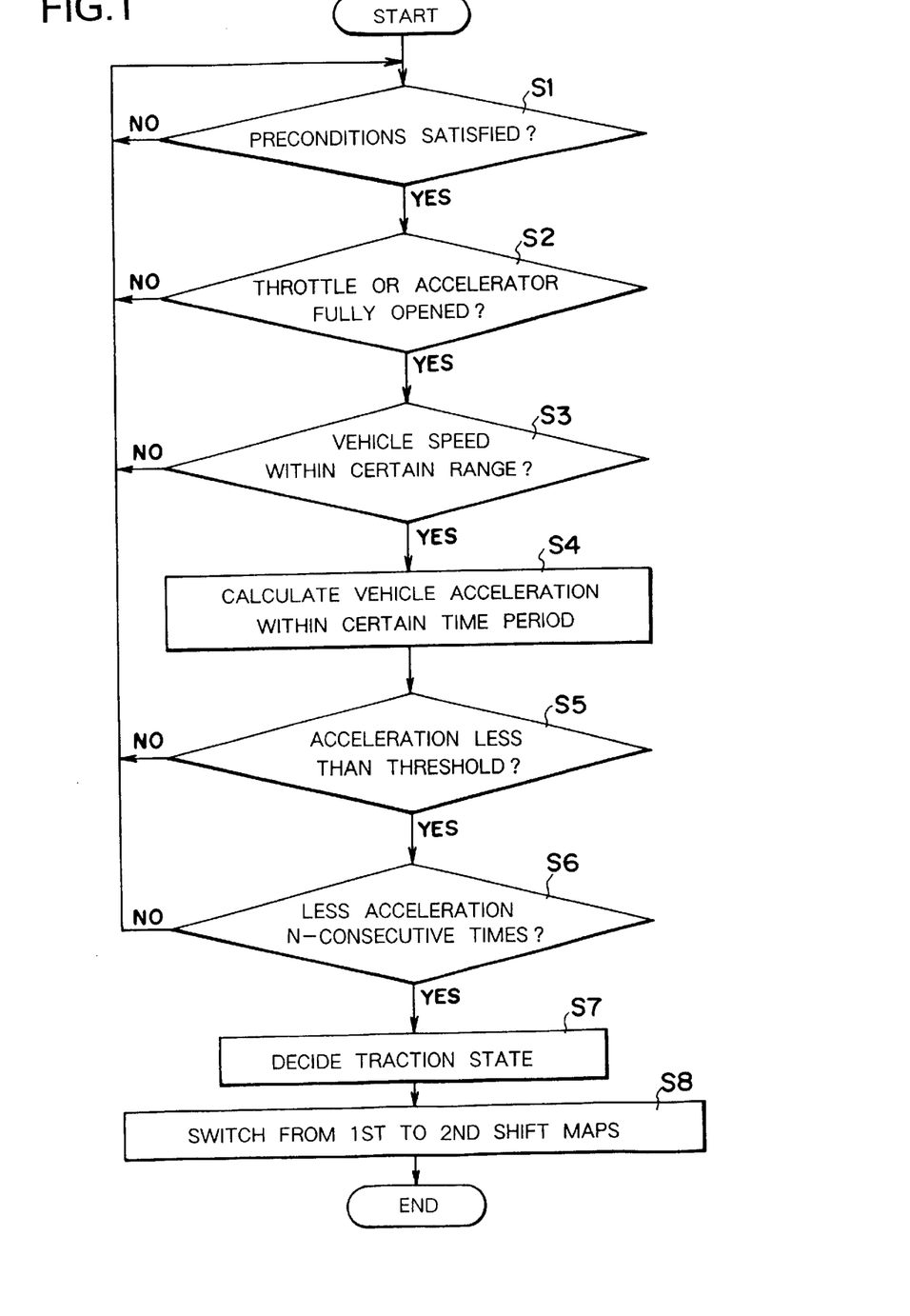
FIG. 1 is a flow chart showing one control example to be used in speed change controls of an automatic transmission in the invention.

For example, at the time of executing the control example of FIG. 1, the shift map to be used at Step S3 is made an identical shift map for the case of the ordinary running state and for the case of the traction running state and the heavy-load running state. In short, the vehicle speeds for setting the upshift lines are made identical. Where the speed change control of the automatic transmission 2 is to be made on the basis of the common shift map, moreover, if the answer of Step S6 is YES, the routine advances via Step S7 to Step S8. At this Step S8, a delay timer is used so that the time period after the speed change decision was made and before the shift signal is outputted may be longer in the traction running state and the heavy-load running state than in the ordinary running state.

In this specific embodiment, as has been described hereinbefore, before the speed change decision based on the first shift map used in the ordinary running state is made, there is estimated the changing state of the physical quantity relating to the engine speed after the speed change decision was made (specifically, after the shift signal was outputted and before the speed change is actually started). Where the estimated result is no less than the threshold value, there is processed the second shift map in which the output timing of the shift signal in the traction running state and the heavy-load running state is delayed more than the output timing of the shift signal in the ordinary running state. Thus, there is made the control to switch the first shift map to the second shift map. Where the vehicle is in the traction running state and in the heavy-load running state, therefore, the gear stage of the automatic transmission 2 can be kept at the 1st speed so long as to a high vehicle speed just before the engine speed reaches a value corresponding to the red zone NE1. Therefore, the running state, in which the drive region (at a predetermined high speed) for a high engine output can be employed, is enlarged to improve the power performance in the case in which the running vehicle runs uphill while pulling another vehicle, so that the drivability can be improved.

Where the vehicle runs on a highland, the density of the intake air is lower than that in the case of running on a lowland. Therefore, the air/fuel ratio changes to make the combustion state of the engine unstable, and the engine output may fall. In the case of running on the highland, too, the power performance of the vehicle can be improved by making the control of FIG. 1.

In the state where the first shift map is selected, on the other hand, at Step S4 of FIG. 1, the following learning control can be made in addition to the aforementioned control (i.e., the control to estimate the variation of the vehicle speed within the predetermined time period on the basis of the changing state of the prevailing vehicle speed). Specifically, before the speed change of the automatic transmission 2 is started, the target value of the physical quantity at the time of starting the speed change of the automatic transmission 2 is set on the basis of the variation of the vehicle speed estimated by the aforementioned control. Then, the speed change decision is made to output the shift signal, and the actual value of the physical quantity relating to the engine speed at the time of starting the actual speed change of the automatic transmission 2 is detected. Then, the target value of the physical quantity and the actual value of the physical quantity are compared, and a control is made to correct (or change) the set vehicle speed of the upshift line of the first shift map on the basis of that comparison result so that the actual value of the physical quantity may approach the target value of the physical quantity.

Where the learning control thus far described is made at Step S4 and where the routine advances to Step S8 at which the first shift map is switched to the second shift map, it is inhibited to correct the speed change control contents of the first shift map. In other words, the control to change the speed change control mode, as based on whether the heavy-load running state is or not, is preferred to the correction of the speed change control contents by the learning control. By thus inhibiting the learning control, it is made possible to avoid the interference between the correction of the speed change control contents by the learning control and the change in the speed change control mode based on whether the heavy-load running state is or not. Thus, it is possible to prevent the speed change control contents, as suited for the traction running state and the heavy-load running state, from being reflected on the speed change control contents of the first shift map.

Where the answer of Step S5 or S6 is NO, the routine returns to Step S1, at which the shift map corresponding to the ordinary running state is continuously selected. Here, the preconditions of Step S1 contain whether the D-position is or not, but may contain the forward running position to be shifted from the 1st to 2nd speeds, such as the "2"-position to "4" position in their decision references.

Here will be described the relations between the specific embodiment thus far described and the invention. The functional means for executing the controls of Step S1 to Step S3 shown in FIG. 1 corresponds to speed change control mode selecting means of the invention; the functional means for executing the controls of Step S4 to Step S8 shown in FIG. 1 corresponds to speed change control mode switching means of the invention; the functional means for executing the control of Step S1 shown in FIG. 1 corresponds to precondition decision means of the invention; and the functional means for executing the control of Step S4 shown in FIG. 1 corresponds to learning control means of the invention. On the other hand: the speed change based on the first shift map illustrated in FIG. 3 corresponds to the first speed change control mode of the invention; the speed change based on the second shift map illustrated in FIG. 3 corresponds to the second speed change control mode of the invention; the upshift lines to be used in FIG. 3 for the decision of the upshift, the downshift lines to be used for the decision of the downshift, and the time period after the speed change decision based on the shift map illustrated in FIG. 3 and before the shift signal is outputted correspond to the speed change control contents of the invention; "the state in which the engine speed is slightly lower than the allowable speed of the engine 1" corresponds to "the physical quantity is in the predetermined state"; "the state in which the output demand is the maximum" corresponds to "the output demand is in the predetermined state"; and the engine 1 shown in FIG. 2 corresponds to the prime mover of the invention.

Here, the foregoing embodiment has been described on the so-called "step type automatic transmission" which can switch its gear ratio stepwise, but the control example shown in FIG. 1 could be applied to the continuously variable transmission which can vary its gear ratio continuously (or steplessly).

What is claimed is:

1. A speed change control system for an automatic transmission, for selectively switching a plurality of speed change control modes of different speed change control contents to control a gear ratio of an automatic transmission disposed on an output side of a prime mover, comprising:

speed change control mode selecting means for selecting a first speed change control mode, if an output demand for said prime mover is in a predetermined state; and speed change control mode switching means for switching said first speed change control mode to a second speed change control mode, if a physical quantity relating to a speed of said prime mover is in a predetermined state when said first speed change control mode is selected.

2. A speed change control system for an automatic transmission according to claim 1, wherein said speed change control mode selecting means includes means for switching said first speed change control mode to said second speed change control mode, if the output demand for said prime mover is the maximum.

3. A speed change control system for an automatic transmission according to claim 2, wherein said speed change control mode switching means includes means for inhibiting leaning control means to correct speed change control contents of said first speed change control mode, when switching said first speed change control mode to said second speed change control mode.

4. A speed change control system for an automatic transmission according to claim 1, wherein said second speed change control mode has speed change control contents which are easily set to a higher gear ratio than that in said first speed change control mode.

5. A speed change control system for an automatic transmission according to claim 1, wherein said second speed change control mode has speed change control contents which are easily set to a high gear ratio so that a time period for holding said physical quantity for a predetermined time period is longer than a time period for said first speed change control mode.

6. A speed change control system for an automatic transmission according to claim 1, further comprising:

learning control means for comparing such a target value of said physical quantity at the time of starting a speed change of said automatic transmission, which is estimated before the speed change is actually started in said automatic transmission, and an actual value of said physical quantity at the time of starting an actual speed change of said automatic transmission, to correct the speed change control contents of said first speed change control mode, on the basis of a comparison result, so that the actual value of said physical quantity approaches the target value of said physical quantity, when said first speed change control mode is selected.

7. A speed change control system for an automatic transmission according to claim 1, wherein the predetermined state of said physical quantity is generated in a running vehicle, if said running vehicle pulls another vehicle and runs uphill.

8. A speed change control system for an automatic transmission according to claim 1, further comprising:

estimation means for estimating said physical quantity at the time of starting the actual speed change, if the output demand for said prime mover is in the predetermined state and if said physical quantity is in the predetermined state, before a speed change decision based on said first speed change control mode is made, wherein said speed change control mode switching means includes means for setting the speed change control contents of said second speed change control mode on the basis of the physical quantity estimated by said estimation means.

9. A speed change control system for an automatic transmission according to claim 1, wherein said speed change control mode switching means includes means for switching said first speed change control mode to said second speed change control mode, if the predetermined state of said physical quantity occurs consecutively predetermined times within a predetermined time period.

10. A speed change control system for an automatic transmission according to claim 1, further comprising:

precondition deciding means for deciding whether or not preconditions for switching said first speed change control mode to said second speed change control mode are satisfied.

* * * * *